United States Patent Office 3,435,091
Patented Mar. 25, 1969

3,435,091
PREPARATION OF 1,2,4-TRIMETHYL-5-ISOPROPYLBENZENE
Paul Hofmann and Karl Peterlein, Gladbeck, Germany, assignors to Gelsenberg Benzin Aktiengesellschaft, Gelsenkirchen, Germany
No Drawing. Continuation-in-part of application Ser. No. 514,394, Dec. 16, 1965. This application May 22, 1967, Ser. No. 640,369
Claims priority, application Germany, Dec. 18, 1964, G 42,312
Int. Cl. C07c 15/00
U.S. Cl. 260—671    10 Claims

ABSTRACT OF THE DISCLOSURE

A process is disclosed for the selective alkylation of pseudocumene with propene to 1,2,4-trimethyl-5-isopropyl-pseudocumene wherein as catalyst there is employed $AlCl_3$, $H_3PO_4 \cdot BF_3$, $AlCl_2 \cdot H_2PO_4$ or $AlCl_2 \cdot H_2PO_4$ saturated with $BF_3$ and wherein the propene is reacted with the pseudocumene in a molar ratio that is greater than 1:1.

---

This application is a continuation-in-part of U.S. patent application Ser. No. 514,394, filed Dec. 16, 1965, and now abandoned.

The invention relates to a process for the preparation of 1,2,4-trimethyl-5-isopropylbenzene. More particularly it relates to a process of preparing 1,2,4-trimethyl-5-isopropylbenzene by the alkylation of 1,2,4-trimethylbenzene (pseudocumene) with propene in the presence of a catalyst.

In the propylation of pseudocumene using aluminum chloride as catalyst at temperatures of 15–90° C., and with a 1:1 molar ratio of propene to pseudocumene, 1,2,4-trimethyl-5-isopropylbenzene is produced as the principal reaction product. In addition, however, there are produced two other isomeric trimethylisopropylbenzenes, along with traces of more highly alkylated compounds. Under certain circumstances, the reaction product also contains traces of unmodified pseudocumene.

In addition to its direct usefulness as an anti-knock fuel component, 1,2,4-trimethyl-5-isopropylbenzene is of considerable technical value as a starting product for the manufacture of pyromellitic acid dianhydride, as it can be oxidized with good yields in the gaseous or liquid phase, e.g., with air or nitric acid, to produce pyromellitic acid or its dianhydride.

It has been observed that, by oxidation in the gaseous phase with solid catalysts, and preferably those containing vanadium, starting materials which contain isomeric trimethylisopropylbenzenes in addition to 1,2,4-trimethyl-5-isopropylbenzene can also be converted with good yields to pyromellitic acid anhydride. If not substantially more than 20% by weight of these isomers are present in the starting mixture, they easily undergo combustion with air or oxygen in the gaseous-phase oxidation, without impairing the oxidation reaction. The mixture to be oxidized should therefore preferably not contain less than 80 weight percent of 1,2,4-trimethyl-5-isopropylbenzene.

Since it is very difficult because of their slight differences in boiling point to carry out a distillative separation of the 1,2,4-trimethyl-5-isopropylbenzene from its mixture with its other isomers, it is advantageous to first conduct the alkylation of the pseudocumene with propene in such a manner that in the main 1,2,4-trimethyl-5-isopropylbenzene is developed, along with only small amounts of its isomers. In such situation, it is then possible by low-cost distillation to separate from the alkylate a fraction which contains more than 80 weight percent of 1,2,4-trimethyl-5-isopropylbenzene.

It is an object of the present invention to provide a method for the selective alkylation of pseudocumene with propene to 1,2,4-trimethyl-5-isopropylpseudocumene.

It is another object to provide a method for the selective alkylation of pseudocumene with propene to 1,2,4-trimethyl-5-isopropylpseudocumene utilizing $AlCl_3$ as well as other catalysts.

These and other objects will appear hereinafter.

In accordance with the invention it has now been discovered that the selective alkylation of pseudocumene with propene to 1,2,4-trimethyl-5-isopropylpseudocumene can be obtained by reacting pseudocumene with propene in the presence of $AlCl_3$, $H_3PO_4 \cdot BF_3$, $AlCl_2 \cdot H_2PO_4$ or $AlCl_2 \cdot H_2PO_4$ saturated with $BF_3$ as catalysts where the propene is utilized in excess. Specifically, it is necessary to use the propene in a quantity that is greater than equimolar referred to in the pseudocumene.

Under these conditions, the undesirable isomeric trimethylisopropylbenzenes are substantially converted to trimethyldiisopropylbenzenes, while the 1,2,4-trimethyl-5-isopropylbenzenes are substantially not affected at all. Because of the great difference in boiling point between the 1,2,4-trimethyl-5-isopropylbenzene and the trimethyldiisopropylbenzenes containing one more isopropyl group, the distillative separation of the fraction having an increased content of 1,2,4-trimethyl-5-isopropylbenzene is easily carried out.

It is in the prior art to separate m-xylene and p-xylene by selective alkylation to tert-butyl aromatics; m-xylene is easily converted to the higher boiling 1,3-dimethyl-5-tert-butylbenzene, while the p-xylene remains substantially unaffected for stereochemical reasons. The unmodified p-xylene is then readily separated by distillation from the 1,3-dimethyl-5-tert-butylbenzene that is formed from the m-xylene.

According to U.S. Patents Nos. 2,816,940 and 2,840,621, other polyalkylbenzenes can be enriched or separated by selective alkylation using therefor tertiary alkylating agents such as isobutene, tert-butyl chloride or diisobutylene.

According to U.S. Patent No. 2,816,940, however, this process is limited to polyalkylbenzenes which have at least three unsubstituted ring carbon atoms. It cannot accordingly be applied in the case of tetraalkylbenzenes, as, for instance, to trimethylisopropylbenzenes.

According to the literature (Industrial Engineering Chemistry, 48, 1181 (1956)), it has heretofore been impossible by the introduction of ethyl, isopropyl or secondary butyl groups, instead of tertiary alkylating agents, to bring about a selective alkylation of polyalkylbenzenes and a separation based thereon.

It is therefore to be considered most surprising to find that, contrary to these findings, trimethylisopropylbenzenes containing only two unsubstituted ring carbon atoms can be enriched or separated by selective alkylation. Particularly unexpected, furthermore, was the observation that this selective alkylation could be carried out utilizing propene, i.e., a nontertiary alkylating agent.

Aluminum chloride, $H_3PO_4 \cdot BF_3$, $AlCl_2 \cdot H_2PO_4$ or $AlCl_2 \cdot H_2PO_4$ saturated with $BF_3$, preferably in quantities of 0.002 to 0.006 mol of catalyst per mol of pseudocumene, is employed as the catalyst for the alkylation. The alkylation can be carried out at temperatures of 0–100° C., and preferably at 40 to 50° C. Up to 2 mols of propene, and preferably 1.05 to 1.3 mols, are added per mol of pseudocumene.

From the examples which follow, it can be seen how the selectivity of the alkylation is substantially increased by the addition of a larger amount of propene than that corresponding to the molar ratio of 1:1 of propene and pseudocumene. As already mentioned, in addition to 1,2,4-trimethyl-5-isopropylbenzene (a), two other isomeric trimethylisoprpylbenzene (b and c) are produced in the propylation of pseudocumene. Isomer c is formed in a smaller quantity, and can be separated from a relatively easily by distillation, in contrast to isomer b.

Consequently, the ratio of a to b is the criterion for evaluating the selectivity of the alkylation. This ratio is designated as Q hereinafter. The quotient or ratio Q (expressed in weight percent) in the alkylate is set out in the table. Q has to be greater than 4.0 if it is desired to obtain a trimethylisopropylbenzene fraction having more than 80 weight percent of 1,2,4-trimethyl-5-isopropylbenzene by distillation of the alkylate.

The quantitative analysis of the reaction products was conducted using therefor a gas fractometer having a polypropylene glycol capillary column 50 m. long.

In the experiments described in the examples 1 liter of pseudocumene was alkylated in each case; the reaction time amounted to 1 hour.

The invention will be described more fully in conjunction with the following examples. It will be understood however, that these examples are given by way of illustration only, and that the invention is not to be construed as limited in spirit or in scope by the details set forth.

EXAMPLE 1

6 g. anhydrous aluminum chloride were added to 1 liter (878 g.) of pseudocumene (7.3 mols), and the propene was added to the resulting mixture while the contents of the reaction vessel were stirred and cooled to a temperature of about 40–50° C. The alkylation was completed after about one hour. The alkylate which was thereby obtained was freed of catalyst residues by washing with water, and dried. As set out above, the ratio Q must be greater than 4 if a fraction boiling at 220–222° C. and containing more than 80 weight percent of 1,2,4-trimethyl-5-isopropylbenzene is to be recovered from the alkylate by distillation.

As the amount of propene increased, so did the selectivity, as can be seen from the values given for Q in Table II.

The yield of 1,2,4 - trimethyl - 5 - isopropylbenzene (a) referred to the pseudocumene contained in the starting product is surprisingly high, and is evidently caused by isomerization processes.

EXAMPLE 3

882 g. (5.4 mols) of a fraction of isomeric trimethylispropylbenzenes boiling at 220–221° C. and having a content of 73.8 weight percent of 1,2,4-trimethyl-5-isopropylbenzene (650 g.) and 25.7 weight percent (226 g.), of the isomeric compound b, were alkylated with 69 g. of propene (1.6 mols), in the presence of 3 g. AlCl$_3$. This corresponded to the following molar ratio:

$$\frac{\text{Isopropyl groups plus propene}}{\text{Trimethylisopropylbenzenes}} = 1.3$$

951 g. of alkylate were obtained, which contained 59.2 weight percent (562 g.) of a trimethylisopropylbenzene fraction boiling at 220–221° C. This fraction consisted of:

86.0% (483 g.) of 1,2,4-trimethyl-5-isopropylbenzene and 13.8% (77 g.) of b isomeric trimethylisopropylbenzene.

In this alkylation with excess propene, 483 g. 1,2,4-trimethyl-5-isopropylbenzene (a) remained unaltered out of the initial 650 g., and 77 g. of isomer b remain unaltered out of the initial 226 g. Accordingly, a large portion of the isomeric trimethylisopropylbenzenes b has been converted, but only a relatively small percentage of the 1,2,4-trimethyl-5-isopropylbenzene a has undergone conversion.

EXAMPLE 4

1000 ml. (878 g.) of pseudocumene (7.3 mols) were mixed with 40 ml. of the addition compound H$_3$PO$_4$·BF$_3$ (see U.S. Patent 2,412,595). The mixture was heated to

TABLE 1.—MOLS PROPENE

| Test No. | Temp. in ° C. | Propene, g. | Mol pseudocumene | Percent by weight | | | Polyalkylate | Q |
|---|---|---|---|---|---|---|---|---|
| | | | | a | b | c | | |
| 1 | 40 | 296 | 0.97 | 7.36 | 23.3 | 0.9 | 0 | 3.2 |
| 2 | 50 | 347 | 1.13 | 66.8 | 14.4 | 1.2 | 11.8 | 4.6 |
| 3 | 40 | 366 | 1.19 | 61.3 | 13.3 | 1.2 | 22.7 | 4.6 |
| 4 | 50 | 367 | 1.19 | 61.7 | 13.6 | 0.7 | 22.0 | 4.5 |
| 5 | 40 | 388 | 1.26 | 58.6 | 11.2 | 0.9 | 28.2 | 5.2 |
| 6 | 40 | 394 | 1.28 | 57.7 | 10.4 | 0.8 | 29.7 | 5.5 |

It can be seen from the table that, as the quantity of propene increases, the ratio of a to b, as expressed by the quotient Q, shows a definite increase. This change in Q is brought about by the quantity of b, which decreases greatly in proportion to a, and which is more easily converted by excess propene to the polyalkylate than isomer a. The polyalkylate consists mainly of trimethyldiisopropylbenzenes.

EXAMPLE 2

Following the procedure set out in Example 1, 1 liter of a mixture of aromatic hydrocarbons containing only 82.8% by weight of pseudocumene in addition to other C$_9$ aromatics, mostly mesitylene, was alkylated at 40° C. with various amounts of propene.

90° C., and the quantity of propene as set out in Table 3 was introduced with stirring. Throughout the alkylation, which takes about one hour, the temperature was maintained at 90° C. The content of isomeric isopropylpseudocumenes in the alkylate was determined by gas fractometry.

TABLE III

| Test No. | Propene, g. | Mols of propene per mol of pseudocumene | Wt. percent of isopropylpseudocumenes | | | |
|---|---|---|---|---|---|---|
| | | | a | b | c | Q |
| 1 | 257 | 0.84 | 25.1 | 15.4 | 6.6 | 1.63 |
| 2 | 314 | 1.02 | 35.2 | 20.4 | 0.1 | 1.72 |
| 3 | 473 | 1.12 | 37.7 | 21.3 | 0.1 | 1.77 |

TABLE II

| Test No. | Propene | Mols of propene/ mol of pseudocumene | Percent by weight | | | Bal., wt., percent | Q |
|---|---|---|---|---|---|---|---|
| | | | a | b | c | | |
| 7 | 290 | 1.14 | 67.4 | 18.3 | 0.8 | 13.5 | 3.7 |
| 8 | 307 | 1.21 | 65.3 | 17.4 | 2.2 | 15.1 | 3.7 |
| 9 | 350 | 1.38 | 69.7 | 15.8 | 1.8 | 12.7 | 4.4 |
| 10 | 370 | 1.46 | 61.3 | 10.6 | 1.3 | 26.8 | 5.8 |

It can be seen from this table that the ratio of *a* to *b*, expressed by the quotient Q, increases as the amount of propene increases.

EXAMPLE 5

1000 ml. (878 g.) of pseudocumene (7.3 mols) were mixed with 40 g. of the catalytically active addition compound $AlCl_2 \cdot H_2PO_4$ (Journal allgemeine Chemie (USSR), vol. 31, No. 3, p. 665). The resulting mixture was heated to 80° C., and the amounts of propene as shown in Table 2 were introduced in approximately one hour. The temperature was kept at 80° C. throughout the alkylation.

TABLE IV

| Test No. | Propene, g. | Mols of propene per mol of pseudocumene | Wt. percent of isopropylpseudocumenes | | | |
|---|---|---|---|---|---|---|
| | | | a | b | c | Q |
| 4 | 275 | 0.90 | 59.2 | 16.4 | 6.6 | 3.6 |
| 5 | 328 | 1.07 | 58.2 | 15.5 | 5.6 | 3.75 |
| 6 | 372 | 1.21 | 52.0 | 10.2 | 3.3 | 5.1 |

Selectivity improves as the molar ratio of propene to pseudocumene increases.

EXAMPLE 6

The same procedure was followed as set out in Example 5, with the exception that $AlCl_2 \cdot H_2PO_4$ saturated with $BF_3$ was used as the catalyst.

TABLE V

| Test No. | Propene, g. | Mols of propene per mol of pseudocumene | Wt. percent of isopropylpseudocumenes | | | |
|---|---|---|---|---|---|---|
| | | | a | b | c | Q |
| 7 | 288 | 0.94 | 63.0 | 17.9 | 5.2 | 3.5 |
| 8 | 360 | 1.17 | 48.4 | 9.9 | 3.7 | 4.9 |
| 9 | 400 | 1.30 | 44.5 | 8.4 | 2.9 | 5.3 |

The improvement of selectivity as reflected by the Q factor can be seen to follow the increase in the molar ratio of propene to pseudocumene.

We claim:

1. A process for the preparation of 1,2,4-trimethyl-5-isopropylbenzene, which comprises reacting pseudocumene with propene in the presence of a member selected from the group consisting of anhydrous $AlCl_3$, $H_3PO_4 \cdot BF_3$, $AlCl_2 \cdot H_2PO_4$ and $AlCl_2 \cdot H_2PO_4$ saturated with $BF_3$ as catalyst, said propene being reacted in an amount in excess of equimolar referred to said pseudocumene.

2. Process according to claim 1, which comprises effecting said contacting, utilizing up to 2 mols propene per mol of pseudocumene.

3. Process according to claim 1, which comprises effecting said contacting, utilizing 1.05 to 1.3 mols of propene per mol of pseudocumene.

4. Process according to claim 1, which comprises effecting said contacting at a temperature of from 0 to 100° C.

5. Process according to claim 1, which comprises effecting said contacting at a temperature of from 30–50° C.

6. Process according to claim 1 wherein said catalyst is $AlCl_3$.

7. Process according to claim 1 wherein said catalyst is $H_3PO_4 \cdot BF_3$.

8. In the process for the preparation of 1,2,4-trimethyl-5-isopropylbenzene by alkylation of pseudocumene with propene in the presence of a member selected from the group consisting of anhydrous $AlCl_3$, $H_3PO_4 \cdot BF_3$, $AlCl_2 \cdot H_2PO_4$ and $AlCl_2 \cdot H_2PO_4$ saturated with $BF_3$, as catalyst, the improvement for selectively alkylating said cumene with propene to 1,2,4-methyl-5-isopropylbenzene of reacting said propene in an amount in excess of equimolar referred to said pseudocumene.

9. A process for the preparation of 1,2,4-trimethyl-5-isopropylbenzene which comprises contacting pseudocumene with propene in the presence of an $AlCl_2 \cdot H_2PO_4$, said propene being present in an amount in excess of equimolar referred to said pseudocumene.

10. Process claimed in claim 9 wherein said $AlCl_2 \cdot H_2PO_4$ is saturated with $BF_3$.

References Cited

UNITED STATES PATENTS

| 2,754,341 | 7/1956 | Kirkland | 260—671 |
| 3,132,189 | 5/1964 | Lutz | 260—671 |

DELBERT E. GANTZ, *Primary Examiner.*

C. R. DAVIS, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,435,091    March 25, 1969

Paul Hofmann et al.

It is certified that error appears in the above identified patent and that said Letters Patent are hereby corrected as shown below:

Column 4, TABLE III, fifth column, line 2 thereof, "20.4" should read -- 20.5 --.

Signed and sealed this 31st day of March 1970.

(SEAL)
Attest:

Edward M. Fletcher, Jr.
Attesting Officer

WILLIAM E. SCHUYLER, JR.
Commissioner of Patents